United States Patent [19]
Luber et al.
[11] Patent Number: 5,046,127
[45] Date of Patent: Sep. 3, 1991

[54] TRANSMISSION PATH TESTER FOR BROADCASTING

[76] Inventors: Gunter Luber, Schlesierstr. 22; Wolfgang Heuer, Hinter dem Kirchdorf 4, both of 3200 Hildesheim; Rudolf Messerschmdit, Gartenstr. 2, 3226 Sibbesse; Uwe Mätzold, Neue Reihe 8, 3320 Salzgitter 61, all of Fed. Rep. of Germany

[21] Appl. No.: 307,353

[22] Filed: Feb. 7, 1989

[30] Foreign Application Priority Data

Feb. 19, 1988 [DE] Fed. Rep. of Germany ....... 3805190

[51] Int. Cl.[5] .......................... H04B 1/00; H04B 1/16; H04B 17/00

[52] U.S. Cl. .......................................... 455/51; 455/67; 455/70; 455/228; 340/902

[58] Field of Search .................. 455/1, 6, 7, 226, 227, 455/228, 99, 345, 51, 132, 133, 137, 45, 57, 70, 67; 340/902

[56] References Cited

U.S. PATENT DOCUMENTS 4,334,320 6/1982 Liman ................................ 455/227
4,499,603 2/1985 Eilers .
4,511,887 4/1985 Fiore .................................... 455/51

OTHER PUBLICATIONS

Blaupunkt Public Information & Notification System, Mar. 1987.

*Primary Examiner*—Gerard R. Strecker
*Assistant Examiner*—Chi H. Pham

[57] ABSTRACT

A warning broadcast system features control signal means, preferably digital, for confirming transmission path integrity prior to broadcast of a spoken warning message. A radio receiver (1) in an alarm center has an auxiliary carrier reception stage (4) which feeds a decoder (5). A coincidence circuit (6) has a first input (7) connected to the decoder output for inputting the received broadcast control signal and a second input (8) for inputting a directly-coupled control signal via a delay line (9) from the control signal generator (10) of the alarm center. When the control signals at the imputs (7, 8) of the coincidence circuit (6) coincide, an output signal (14) actuates a release (15) for the spoken warning message. If a plurality of transmitters (3) having different frequencies are networked, separate receivers (1,1', . . . ) set to the respective frequencies can feed their respective outputs (14, 14', . . . ) to an AND-gate (16) which triggers release (15).

3 Claims, 1 Drawing Sheet

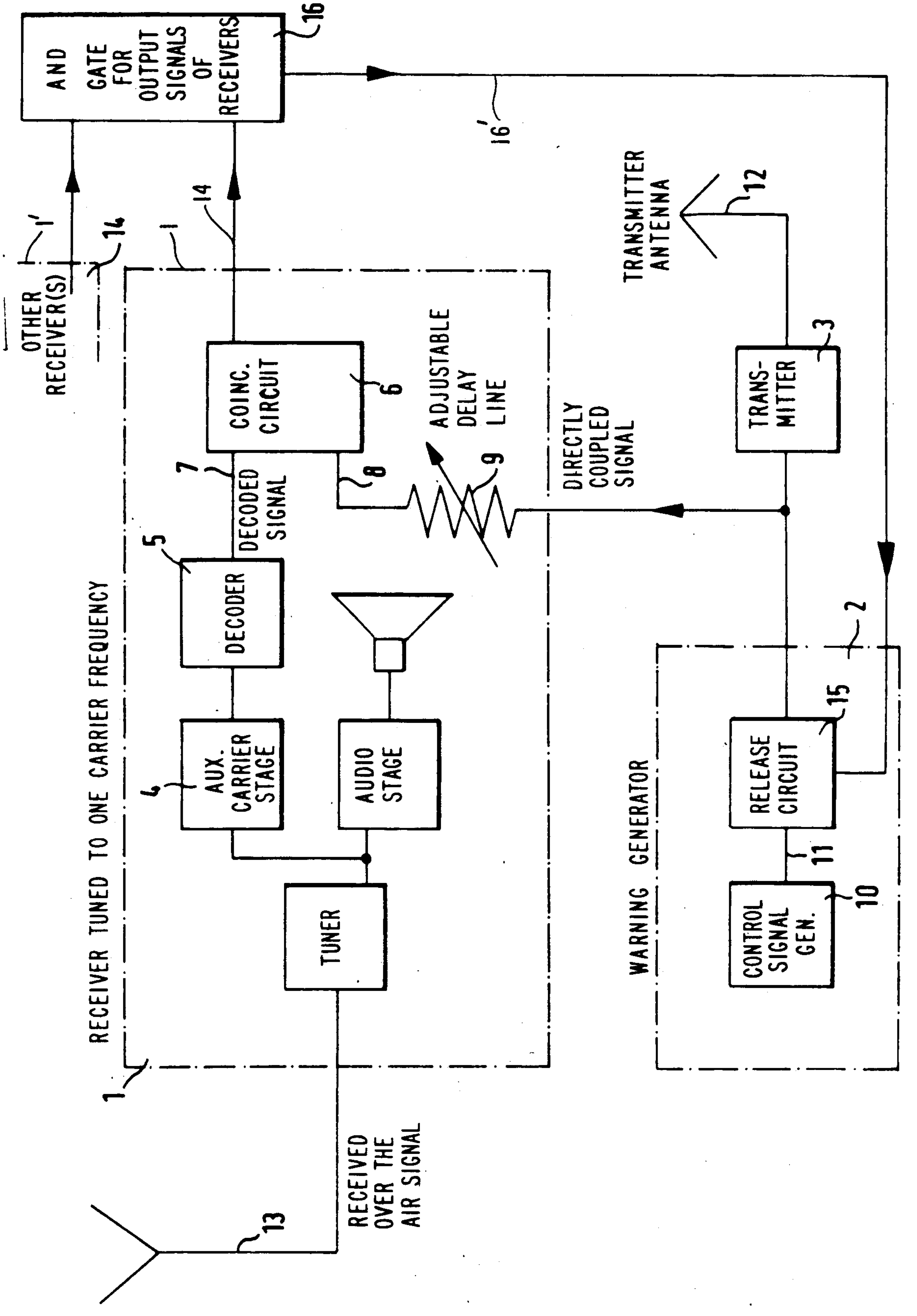
AND GATE FOR OUTPUT SIGNALS OF RECEIVERS
16
16'
OTHER RECEIVER(S)
1'
14
1
TRANSMITTER ANTENNA
12
COINC. CIRCUIT
6
ADJUSTABLE DELAY LINE
9
8
7
DECODED SIGNAL
DIRECTLY COUPLED SIGNAL
TRANS-MITTER
3
DECODER
5
AUX. CARRIER STAGE
4
AUDIO STAGE
TUNER
RECEIVER TUNED TO ONE CARRIER FREQUENCY
2
RELEASE CIRCUIT
15
11
CONTROL SIGNAL GEN.
10
WARNING GENERATOR
RECEIVED OVER THE AIR SIGNAL
13

TRANSMISSION PATH TESTER FOR BROADCASTING

Cross-reference to related application, assigned to the assignee of the present invention, the disclosure of which is hereby incorporated by reference:

POWER CONSERVING SYSTEM FOR RADIO ALERT RECEIVERS, LUBER et al., Ser. No. 07/307,349, filed Feb. 7, 1989.

Cross-reference to related patents, assigned to the assignee of the present invention, the disclosures of which are hereby incorporated by reference:

U.S. Pat. Nos. 4,334,320, LIMAN; 4,476,581, BRAGAS; 4,499,603, EILERS; 4,543,532, KASSAR; 4,584,708, BRAGAS & EILERS; 4,679,238, MARKOVIC; 4,719,623, LEYSER: 4,736,392, KAMMEYER.

The present invention relates generally to radio systems with emergency broadcast features and, more particularly, to a system in which transmission path integrity over both land lines and broadcast signal paths can be confirmed prior to broadcast of the spoken warning messages.

BACKGROUND

Radio systems which permit pre-emption of regular programming for special announcements or warnings, e.g. about traffic accidents or traffic congestion in the vicinity of a particular transmitter broadcasting a particular auxiliary carrier signal, are well known, and are described in, among others, the above-noted U.S. patents of Blaupunkt Werke GmbH.

THE INVENTION

Blaupunkt Werke GmbH has issued a brochure on its PINS (Personal Information & Notification System) devices. The brochure describes, among other things, radio receivers for warning and emergency broadcasts.

In such a system, a centrally generated warning broadcast is to be transmitted to the population over the maximum possible number of warning transmitters. For the alarm center, it is immaterial which respective programs the individual stations happen to be transmitting over their associated transmitters and carrier frequencies at the instant that the warning is generated. Since it is not possible for the alarm center to control the operational readiness of all the transmitters of the system in such a way that all the programs running are ceased, this raises the question of the operational readiness of the transmitters. However, this is not critical for the alarm center until the moment comes when it is actually time to broadcast a warning.

To convey the warning broadcast to the population, however, requires not merely the operational readiness of the transmitters. Rather, the land transmission lines between the alarm center and the studios of the transmitters must also be operational, so that the warning broadcast can be transmitted over each of the networked transmitters. In such a system, there is thus the task of confirming, for the alarm center, whether or not the transmission path for the warning broadcast to the receivers is undisturbed.

Briefly, the alarm center has a control signal generator which sends a control signal to each radio receiver before the spoken warning is sent. A special radio receiver in the alarm center has a coincidence circuit for receiving not only the broadcast control signal, but also a directly-coupled control signal which has been delayed for a period which simulates the transmission time of the broadcast signal. If the broadcast signal path is intact, the two control signals will coincide, so the receiver will actuate a release, in the alarm center for the spoken warning.

Drawing

The single figure is a block diagram of the radio receiver system of the present invention.

Detailed Description

As shown in the drawing, the system of the present invention features a receiver 1, which is part of an installation for pre-emptive transmission of warning broadcasts, that is, the receiver will interrupt-regular programming in favor of the warning broadcast. The receiver is installed in an alarm center which includes, in addition to the receiver, a warning generator 2 which can be connected to a broadcast transmitter 3. The broadcast transmitter 3 is, as a rule, not housed in the alarm center.

Receiver 1 gives the personnel in the alarm center control over the operational readiness of the entire warning transmission path, since the certainty of transmission of the warning to the listeners of all the networked transmitters is assured by the following steps: first, when warning generator 2 is switched on, it generates a digital warning message or packet This digital signal is used in the modulator of transmitter 3 to modulate an auxiliary carrier signal. Receiver 1 includes an auxiliary carrier reception stage 4 and a decoder 5 for extracting the control signal from the auxiliary carrier. Together, these stages permit receiver 1 to indicate, and confirm reception of, the warning packet.

Receiver 1 also contains a coincidence circuit 6 having two inputs. The first of these inputs is connected to the output of decoder 5. The second of these inputs is connected, via a delay line 9, to an output 11 of a control signal generator 10 in warning generator 2.

Delay line 9 simulates the transmission time required for the control signal to pass from output 11 of control signal generator 10 over a first transmission path segment to the studio of transmitter 3 and the antenna installation 12 of transmitter 3, thence via a second transmission path segment to the antenna 13 of receiver 1 to the output of decoder 5 in receiver 1. This delay line must be adjusted for each of the carrier frequencies picked up by the receiver.

The output 14 of coincidence circuit 6 is connected with a release circuit 15 for the actual warning generator, whose transmission, after release, is transmitted in the base band of the transmitter connected thereto.

The foregoing means assure that the warning transmission is not broadcast until the entire transmission path is in place.

Preferably, the warning transmission center has further receivers 1' installed for each connected transmitter, which receivers are set to the respective transmitter frequencies and have their respective delay lines adjusted accordingly.

If one connects outputs 14, 14' of respective coincidence circuits 6 to release circuit 15 by means of an AND-gate 16, this will assure that the spoken warning transmission is not sent until the integrity of the whole transmission path is confirmed.

This is of substantial importance, since warning only a portion of the population, who are listeners of specific broadcast stations to which the transmission lines are intact, and not warning another portion of the population, who are listeners of broadcast stations to which the transmission lines could not be established, would likely lead to confusion. In such a situation, the decision, whether to manually over-ride and release the warning transmission, despite the incompleteness of the network, can be left to the alarm center authorities.

Various changes and modifications are possible within the scope of the inventive concept.

We claim:

1. Radio receiver for a system for pre-emptive transmission of a warning message, especially a pre-recorded message, from an alarm center over a first transmission path segment to a plurality of broadcast transmitters and thence over a second, over-the-air, transmission path segment to receivers, comprising, a decoder (5) forming part of a broadcast receiver, responsive to a control signal which is transmitted before a warning message, and having an output furnishing a decoded version of said control signal derived from a received over-the-air broadcast, a coincidence circuit (6) having a first input (7) connected to said decoder output and a second input (8) connected via a delay line (9) with an output of a control signal generator (10) in said alarm center, said delay line serving to simulate actual delays in said first and second transmission path segments and to thereby synchronize said received decoded control signal, if any, with an output signal of said control signal generator (10), said coincidence circuit (6) having an output (14) connectable to a release circuit (15) of said alarm center, and responding to coincidence of said output signals by actuating said release circuit (15), to thereby assure transmission path integrity, prior to broadcast of warning messages.

2. Radio receiver system for pre-emptive transmission of warning messages, especially pr-recorded message, from an alarm center (2) over broadcast transmitters, comprising, a plurality of radio receivers (1, 1', . . . ), each set to a respective broadcast frequency, and each containing means (4,5,6) for generating, at a respective output (14, 14', . . . ) an output signal which confirms broadcast reception (13) of a coded control signal, and an AND-gate located adjacent said receivers, having respective inputs each connected to one of said radio receiver outputs (14, 14', . . . ) and having an output (16') connected to a release circuit (15) in said alarm center (2), to thereby assure transmission path integrity, over each of said respective broadcast frequencies, prior to broadcast of said warning message.

3. Warning broadcast system for an alarm center which can be networked on demand with a plurality of transmitters (3).

comprising means (10) in said alarm center for generating and transmitting a control signal;

means (3, 12), connected to said control signal generating means (10), for broadcasting said control signal;

means (13, 4, 1) for receiving said broadcast control signal;

a decoder (5), coupled to said receiving means, in said alarm center (2), for decoding said control signal;

a coincidence circuit (6), in said receiving means, connected to an output of said decoder (5);

means (9) in said alarm center for coupling said control signal, with a delay, directly from said control signal generating means (10) to said coincidence circuit (6);

said coincidence circuit comparing said directly-coupled control signal and said broadcast control signal, and means (15) in said alarm center, coupled to an output (14) of said coincidence circuit, for releasing warning broadcasts when said directly-coupled and broadcast control signal coincide.

* * * * *